G. H. TAFT.
Process and Apparatus for Changing the Bearing Year of Fruit Trees.
No. 227,074.                    Patented April 27, 1880.
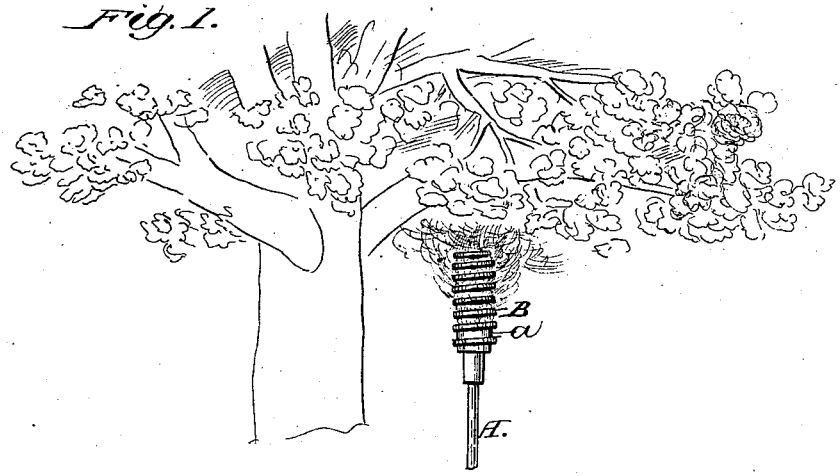
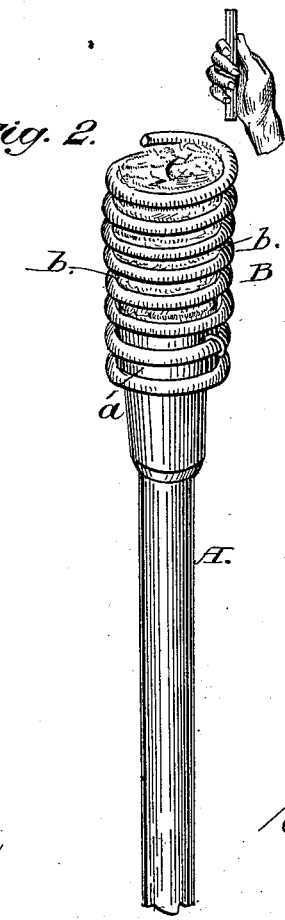

UNITED STATES PATENT OFFICE.

GEORGE H. TAFT, OF GRAFTON, MASS., ASSIGNOR TO CHARLES L. LEONARD AND SUMNER F. LEONARD, OF SAME PLACE, ONE-FOURTH TO EACH.

PROCESS AND APPARATUS FOR CHANGING THE BEARING YEAR OF FRUIT-TREES.

SPECIFICATION forming part of Letters Patent No. 227,074, dated April 27, 1880.

Application filed February 14, 1880.

*To all whom it may concern:*

Be it known that I, GEORGE H. TAFT, of Grafton, in the county of Worcester and State of Massachusetts, have invented certain new and useful Improvements in a Process and Apparatus for Changing the Bearing Year of Fruit-Trees; and I do hereby declare that the following is a full, clear, and exact description of the invention, which will enable others skilled in the art to which it appertains to make and use the same, reference being had to the accompanying drawings, which form a part of this specification, and in which—

Figure 1 is an illustration of the process involving the use of my apparatus, and Fig. 2 is a perspective view of the apparatus.

Similar letters of reference indicate corresponding parts in both the figures.

As is well known, many fruit-trees are biennial in their nature, or bear fruit only every second year. In most of the fruit-growing States apple-trees, for instance, bear a very large crop of fruit every other year, resting alternate years, or bearing no or very little fruit, the result of which is, that apples are a drug in the market during the bearing years, but very scarce during the resting years. To remedy this the bearing year of, say, one-half of the trees in an orchard may be changed by picking off the blossoms before the fruit develops; but this is a slow and tedious process, besides which the blossoms, many of which are clustered at the extreme ends of thin twigs and branches in the top of the tree, cannot all be reached by the picker, whose efforts therefore result in only partial success.

Hence my process consists in destroying the tender blossoms by singeing or scorching, which may be done without injury to the tree, and can be effected in a simple, expeditious, and convenient manner with the aid of my apparatus or flambeau. This apparatus is shown in Fig. 2 of the drawings, and consists of a long pole or handle, A, provided with a metallic head or cap, *a*, at its upper end, upon and around which is secured a spiral spring, B, about three and one-half inches in diameter. The cylindrical recess *b* within this spring is filled with cotton-waste or similar material, C, which is soaked in kerosene-oil and ignited, after which the torch or flambeau is carried along under the branches of the tree, as shown in Fig. 1. The thin and delicate leaves and tendrils of the flowers are thus effectually and rapidly destroyed, preventing the tree from setting fruit.

If desired, the one-half part of a tree may be treated in this manner, so that it will bear fruit each year, alternately on one side and on the other.

Having thus described my invention, I claim and desire to secure by Letters Patent of the United States—

1. The herein-described process of changing the bearing year of fruit-trees by singeing or scorching the flowers before the development of fruit, substantially as set forth.

2. A torch or flambeau for singeing or scorching the flowers before the development of fruit, consisting of a pole or handle, A, provided with a metallic head or cap, *a*, wire coil B, and cotton-waste or bibulous packing C, substantially as set forth.

In testimony that I claim the foregoing as my own I have hereto affixed my signature in presence of two witnesses.

GEORGE HENRY TAFT.

Witnesses:
JOEL TAFT,
HENRY MANN.